(No Model.)
J. G. HALLAS.
COUPLING SLEEVE.
No. 454,648. Patented June 23, 1891.
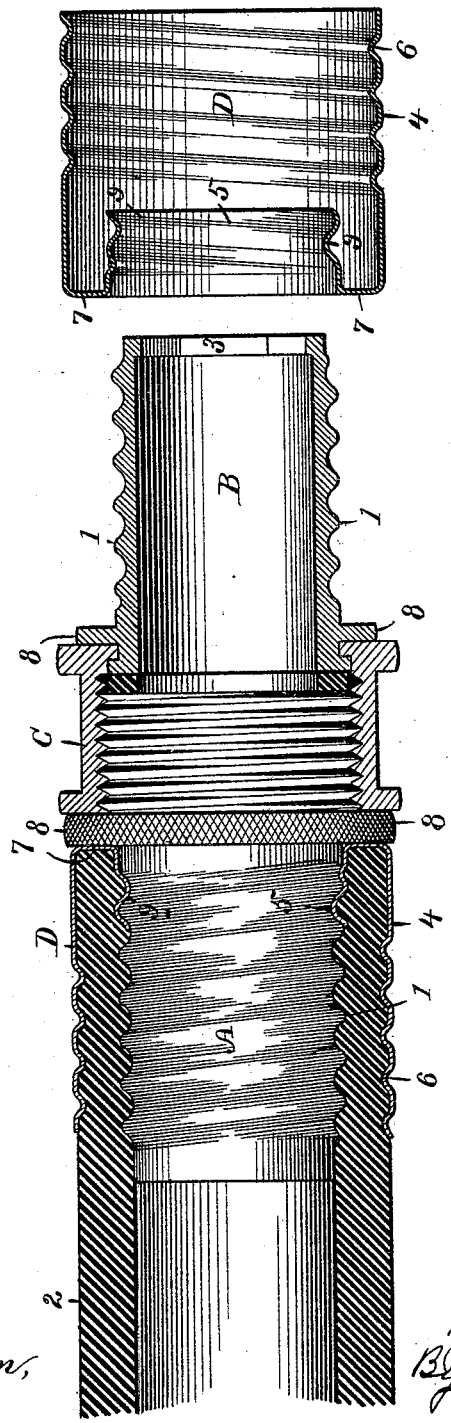
WITNESSES
C. M. Newman,
Arley J. Munson.
INVENTOR
James G. Hallas
By F. M. Wooster
Atty.

UNITED STATES PATENT OFFICE.

JAMES G. HALLAS, OF WATERBURY, CONNECTICUT.

COUPLING-SLEEVE.

SPECIFICATION forming part of Letters Patent No. 454,648, dated June 23, 1891.

Application filed November 17, 1890. Serial No. 371,638. (No model.)

*To all whom it may concern:*

Be it known that I, JAMES G. HALLAS, a citizen of the United States, residing at Waterbury, in the county of New Haven and State of Connecticut, have invented certain new and useful Improvements in Coupling-Sleeves; and I do hereby declare the following to be a full, clear, and exact description of the invention, such as will enable others skilled in the art to which it appertains to make and use the same.

My invention has for its object to produce a flexible sheet-metal coupling-sleeve, adapted to be used in connection with any of the various hose-couplings now upon the market, which shall be so constructed as to grip the attaching portion of the coupling, to take a double grip upon the hose itself—that is, to engage it both internally and externally; and, furthermore, by means of the flexibility of the sleeve itself to cause it to conform to inequalities in the hose and differences in thickness in the opposite sides thereof.

With these ends in view I have devised the simple and novel coupling-sleeve which I will now describe, referring by numerals to the accompanying drawing, forming part of this specification, said drawing representing the parts of a hose-coupling, partly in elevation and partly in section, a section of hose being attached at one end by means of my novel coupling-sleeve, and the sleeve shown detached at the opposite end.

A, B, and C denote the ordinary members of a hose-coupling, which may be made in the ordinary or any preferred manner. Members A and B are provided with rounded threads 1, which engage the hose 2. The inner ends of these members are provided with polygonal openings 3, which are engaged by a suitable key in turning the members to place.

D denotes my novel coupling-sleeve, which is made of sheet metal and is in fact a double sleeve, the outer sleeve being denoted by 4 and the inner sleeve by 5. The outer sleeve is provided with circular or spiral internal ribs 6. At the outer end of the sleeve the metal is turned inward horizontally, forming a surface 7, which is adapted to abut against a flange 8 on either part of the coupling, and is then turned parallel with the outer sleeve to form the inner sleeve, which is made shorter than the outer sleeve and is provided with a rolled thread 9, which is adapted to engage the thread 1 on either part of the hose.

In use, the operator simply slips the coupling-sleeve over the end of hose, taking care to see that the end of hose is cut square and is firmly seated against the inner side of surface 7 and then by means of a suitable key turns the part of the coupling into place, the thread of the coupling engaging thread 9 on the inner sleeve.

It is of course well known by all who have ever handled the ordinary hose of commerce that various inequalities occur in the same length of hose and that opposite sides of the hose are rarely of the same thickness. This is fully compensated for in my novel coupling-sleeve by making the sleeve of metal having sufficient flexibility to yield readily when the part of the coupling is turned into place. The effect of screwing the coupling to place after the coupling-sleeve is in position is to give a strong double grip upon the hose, the thread 1 of the coupling taking hold of the interior of the hose, but without breaking the lining and expanding it outward, forcing the exterior of the hose into the spaces between ribs 6 on the outer sleeve, and also forcing the coupling-sleeve to adapt itself to the inequalities of the hose. It should be noticed, furthermore, that in addition to the hold which thread 1 of the coupling takes upon the interior of the hose it also takes a firm hold upon thread 9 on the inner sleeve, this thread being of course rolled to the same shape and pitch as thread 1.

I have found in practice that the use of my novel coupling-sleeve dispenses entirely with the ordinary clamps, wires, &c., in common use, insures a water-tight coupling of great durability, which will remain firmly in place without repair, and which, moreover, may be readily removed, if required.

I make no claim in this application to the process of making hose-couplings from sheet metal, which is set forth in my former application, Serial No. 350,554, nor to a coupling member having a thread provided at its inner end with a reduced non-threaded portion, nor to a member provided with threads rounded on their outer edges, and having between said threads grooves relatively wide, as set forth in my pending application, Serial No. 353,581, filed May 29, 1890.

Having thus described my invention, I claim—

1. A flexible sheet-metal coupling-sleeve consisting of an outer sleeve and an inner sleeve which are adapted to receive the hose between them, the end of the hose abutting against the surface between said sleeves, the inner sleeve being provided with a thread to correspond with the ordinary attaching-thread of a coupling and the outer sleeve being provided with inwardly-extending ribs, between which the exterior of the hose is forced when the coupling is turned to place, thereby giving a firm grip upon the inner and outer sides of the hose.

2. A flexible sheet-metal coupling-sleeve consisting of an outer sleeve and an inner sleeve between which the end of hose is received in use, the inner sleeve being provided with a thread corresponding with the ordinary attaching-thread of a coupling, so that when the coupling is turned to place the hose is clamped firmly between said inner and outer sleeves.

3. The combination, with the members of a hose-coupling and a sleeve by which they are connected, said members having rounded threads to engage ends of hose, of flexible coupling-sleeves D, consisting of inner and outer sleeves which are adapted to receive the hose between them, each inner sleeve being provided with a thread to correspond with the threads upon the members, so that in use the hose is clamped firmly between the outer sleeves and the inner sleeves and the coupling members, substantially as described.

In testimony whereof I affix my signature in presence of two witnesses.

JAMES G. HALLAS.

Witnesses:
ROSWELL H. BUCK,
W. H. THOMPSON.